United States Patent [19]

Waddington et al.

[11] Patent Number: 4,569,196
[45] Date of Patent: Feb. 11, 1986

[54] LUBRICATION SYSTEM

[75] Inventors: Clive Waddington, Stratford; Normand L. Lagasse, Milford; George T. Milo, Bridgeport; John G. Van Kamerik, Huntington, all of Conn.

[73] Assignee: Avco Corporation, Stratford, Conn.

[21] Appl. No.: 602,343

[22] Filed: Apr. 20, 1984

[51] Int. Cl.$^4$ ............................................. F02C 7/06
[52] U.S. Cl. ................................. 60/39.08; 184/6.11
[58] Field of Search ..................... 60/39.08; 184/6.11; 137/81.1; 123/196 CP, 196 S

[56] References Cited

U.S. PATENT DOCUMENTS

| | | | |
|---|---|---|---|
| 2,669,245 | 2/1954 | Walker | 137/81.1 |
| 2,725,956 | 12/1955 | Cunningham | 137/81.1 |
| 2,740,267 | 4/1956 | Bayard | 60/39.08 |
| 2,827,342 | 3/1958 | Roach | 184/6.11 |
| 2,996,146 | 8/1961 | Beam et al. | 60/39.08 |
| 3,424,374 | 1/1969 | Robey | 60/39.08 |
| 3,572,356 | 3/1971 | Pinto | 60/39.08 |
| 4,170,873 | 10/1979 | Milo | 60/39.08 |
| 4,245,465 | 1/1981 | Milo | 60/39.08 |

FOREIGN PATENT DOCUMENTS

378644  2/1940  Italy ................................. 123/196 S

Primary Examiner—Louis J. Casaregola
Attorney, Agent, or Firm—Ralph D. Gelling

[57] ABSTRACT

A lubrication system including a regulating valve and a bellows is provided for controlling the flow of lubricant from a source of lubricant under pressure to the gearbox and sump of an aircraft gas turbine engine as a function of the altitude at which the engine is operating. An override valve by-passes the regulating valve and cuts off flow of lubricant to the sump while assuming control of lubricant flowing from the source to the gearbox when a detent valve, operatively associated with the bellows, detects that either the regulating valve or the bellows is inoperative and permits the override valve to become operative.

13 Claims, 6 Drawing Figures

LUBRICATION SYSTEM

BACKGROUND OF THE INVENTION

A gas turbine engine designed for use in aircraft typically includes one or more units, such as gearboxes, supplied with lubricant by a positive displacement pump directly driven by the compressor section of the engine. As the aircraft ascends from sea level to altitude, the power output of the engine decreases thereby reducing the amount of lubricant needed by its associated units to maintain satisfactory operation. However, the rotational speed of the engine and, hence, the speed of the lubricating pump are held relatively constant. As a result, the flow of lubricant to the units also remains relatively constant at a rate in excess of their requirements under reduced power conditions. Moving parts, such as gears within the units, churn the excess lubricant and consume energy needlessly thereby reducing the efficiency of the engine. To eliminate this problem, the present invention provides control means for reducing the flow of lubricant to the units when the engine operates at altitude, thereby improving engine efficiency. Fail safe protection is also provided to assure an adequate supply of lubricant to the units in the event that the lubricant control means should malfunction.

SUMMARY OF THE INVENTION

The preferred embodiment of the present invention is described in association with a fan-type gas turbine engine. It comprises a movable regulating valve for controlling the amount of oil flowing from the engine's high pressure oil supply to the gearbox driving the fan of the gas turbine engine. The position of the regulating valve is determined by an altitude sensor that is configured to position the regulating valve to reduce the flow of oil as a function of the altitude at which the engine is operating. Since reliability of operation is of prime importance, an override valve and associated detent valve are also provided to assume, automatically, control of the oil flow in the event that the regulating valve or altitude sensor become inoperative. Under such conditions, the override valve admits oil to the gearbox in an amount suitable for operation at sea level. In this way, safe operation is assured even though engine efficiency is temporarily sacrificed because of the malfunction of the regulating valve or altitude sensor.

DESCRIPTION OF THE DRAWINGS

The invention is described in more detail below with particular reference to the attached drawings in which.

LUBRICATION AT ALTITUDE

Figure 1:
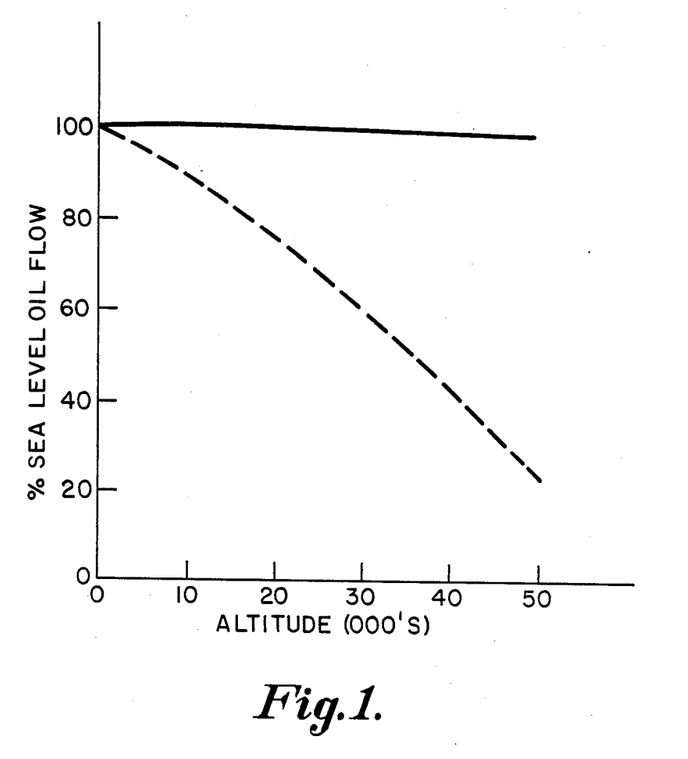
FIG. 1 is a graph showing oil flow to the gearbox at various altitudes and the effect of controlling the oil flow by use of the present invention.

Referring first to FIG. 1, there is shown a graphical plot of oil flow to the gearbox vs. the altitude at which the gas turbine engine is operating. The plot assumes substantially constant engine speed which is typically the case regardless of the altitude at which the engine is operating.

The top solid-line curve shows the amount of oil that will be supplied to the gearbox in state-of-the-art engines. It should be noted that the amount of oil supplied is substantially constant regardless of altitude. In contrast, the dash-line curve shows how the oil flow is reduced through use of the present invention as altitude increases. Such reduced flow is sufficient for satisfactory gearbox operation while conserving energy that otherwise would be wasted due to the presence of excess oil in the gearbox.

DESCRIPTION OF OPERATION

Figure 2:
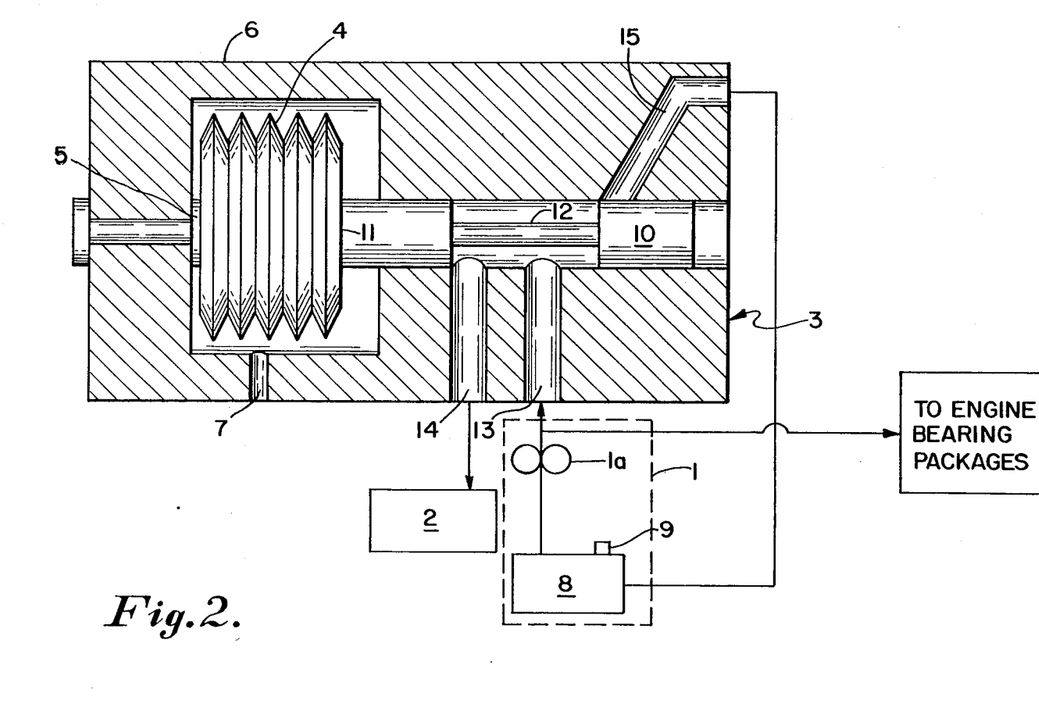
FIG. 2 is a simplified schematic showing the positions of the regulating valve and altitude sensor when the gas turbine engine is running at sea level.

FIG. 2 shows a schematic of the various elements of the invention in association with a source of oil under pressure 1 and a gearbox 2 driven by a gas turbine engine (not shown). Those elements comprise a regulating valve, generally designated 3, connected to an altitude sensor 4 in the form of a bellows secured at 5 to housing 6, the interior of which adjacent the bellows, communicates through channel 7 with oil sump 8 vented at 9 to the atmosphere in which the engine is operating. As will be explained more fully, these elements cooperate in regulating the flow of oil from the source to the gearbox as a function of altitude as illustrated by the dash-line curve of FIG. 1.

The source of oil pressure is typically a positive displacement gear pump 1a driven by the compressor section of the gas turbine engine. Although optimum efficiency dictates that the compressor be operated at substantially constant rotational speed regardless of altitude, the power output of the engine as a whole and hence the lubrication requirements of the gearbox 2 decrease with altitude. For purposes of illustration, it may be assumed that the gearbox 2 drives the external fan of a fan-type gas turbine engine through a multiplicity of gears (not shown) housed within the gearbox. If oil is present in the gearbox in excess of its requirements for satisfactory lubrication, the gears churn the oil wasting energy thereby penalizing engine performance and generating heat that must be dissipated to the atmosphere. By reducing the oil flow as altitude increases, it has been found that the power output of the engine can be increased by as much as 3% at 35,000 feet altitude.

In the schematic, the regulating valve 3 comprises a spool valve 10 connected at 11 to the bellows 4. The mid-section 12 of the spool valve is reduced in diameter to permit oil to flow from the source 1 through channel 13 to channel 14 which is connected to gearbox 2. Under normal operating conditions, the position of the spool valve is determined by bellows 4. At sea level, the bellows, which is evacuated to a 150,000 foot altitude condition, is collapsed by sea level pressure thereby positioning spool valve 10 as shown in FIG. 2.

Figure 3:
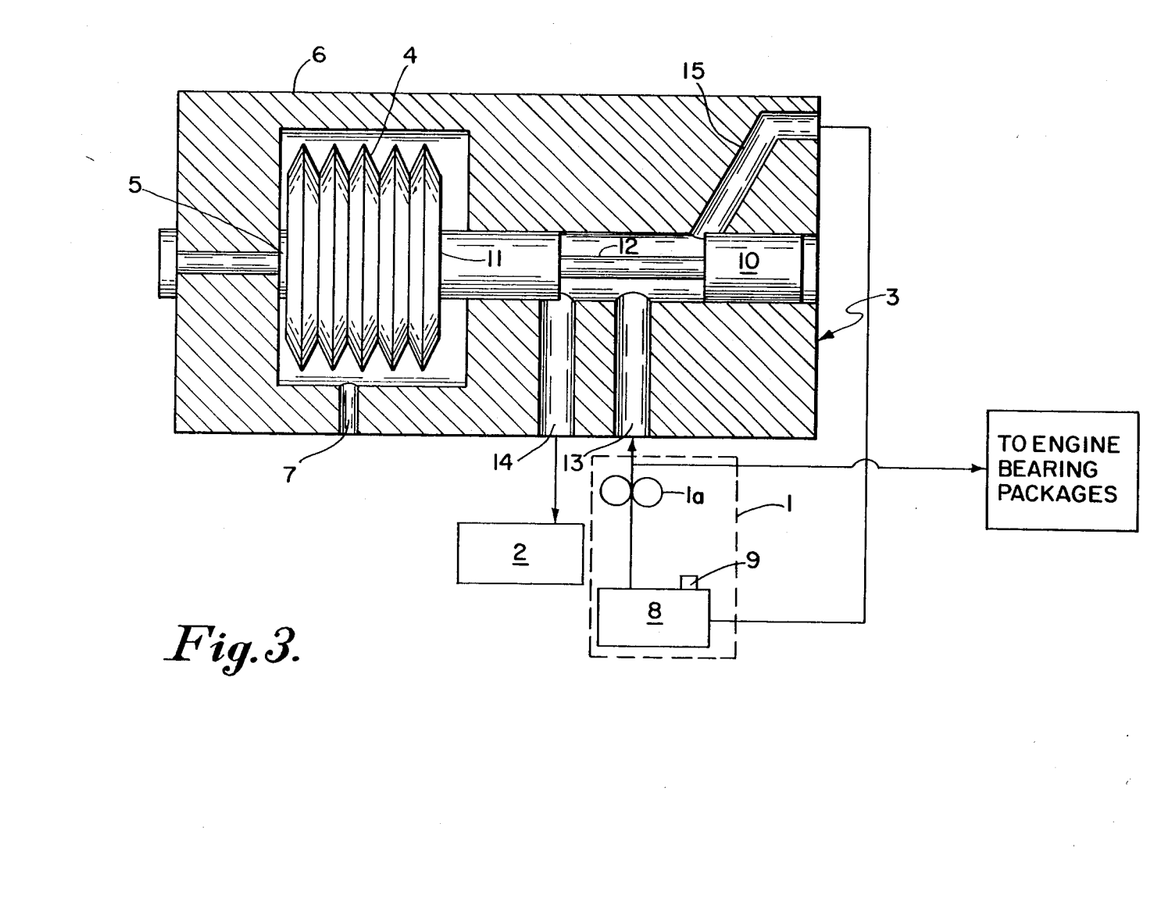
FIG. 3 is a schematic showing the positions of the regulating valve and altitude sensor when the engine is operating at high altitude.

In the schematic of FIG. 3, it has been assumed that the engine is operating at 35,000 feet altitude. Since at that altitude the ambient pressure acting on the bellows is less than at sea level, the bellows expands thereby shifting the spool valve 10 to the right as shown. The repositioning of the valve partially blocks channel 14 thereby impeding oil flow to gearbox 2. Simultaneously, spool valve 10 uncovers a channel 15 that is connected to oil sump 8 from which oil is pumped back to source 1 by gear pump 1a. Dumping oil through channel 15 allows the oil flow from pump 1a to be maintained at its full level and thereby prevents back pressures caused by the restriction of flow through channel 14.

As the engine descends to sea level, the bellows is gradually compressed, shifting spool valve 10 to the left as viewed in the schematic. As the spool valve is shifted, channel 15 is gradually blocked off and the flow of oil to sump 8 is cut off. Simultaneously, spool valve 10 admits an increased flow of oil from channel 13 to channel 14 via mid-section 12 of the spool valve. At sea level, the spool valve 10 is restored to the position shown in FIG. 2.

Figure 4:
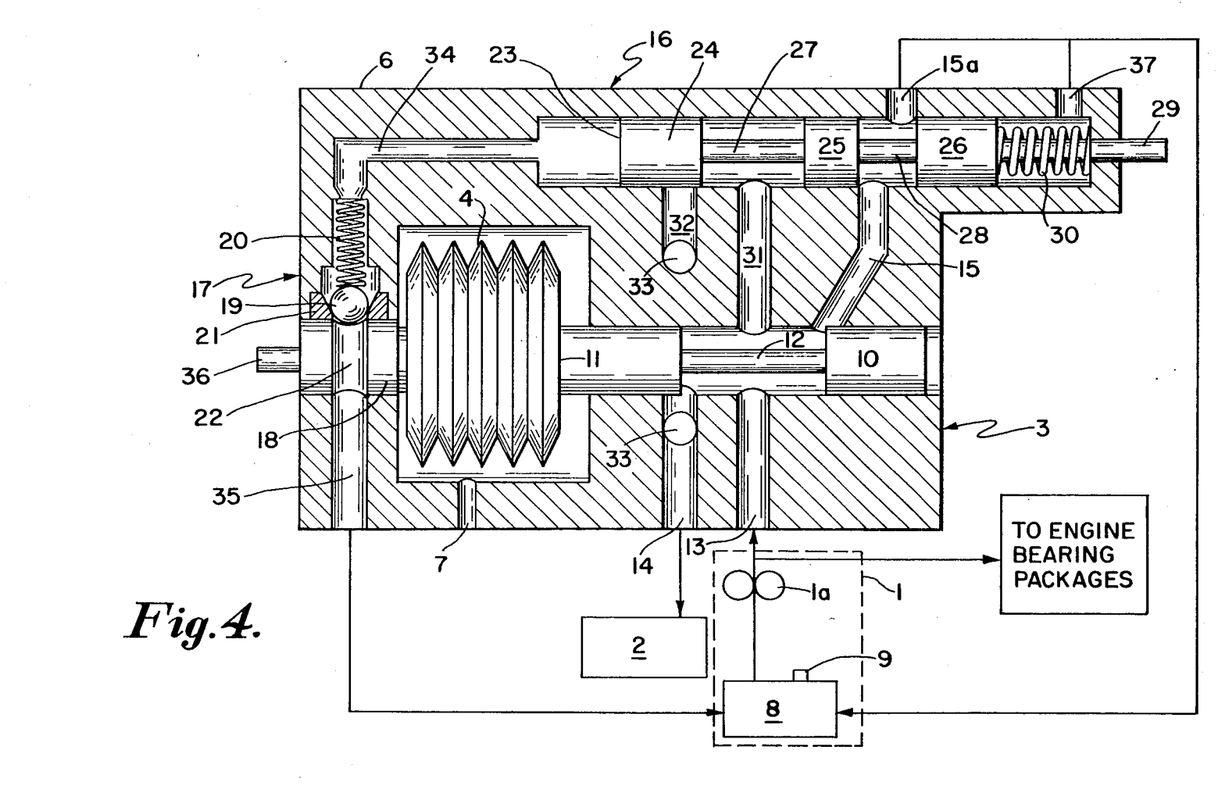
FIG. 4 is a schematic showing the regulating valve and altitude sensor in combination with an overrride valve and a detent valve as they are positioned for normal operation at high altitude.

FIG. 4 again shows the spool valve 10 connected at 11 to one end of bellows 4. As described with reference to FIGS. 2 and 3, the spool valve is configured to control flow of oil from source 1 to gearbox 2 as a function of the altitude surrounding bellows 4. In addition, FIG. 4 shows an override valve, generally designated 16, and detent valve, generally designated 17. The override valve is arranged to assume control of the flow of oil to gearbox 2 automatically in the event that spool valve 10 or bellows 4 are for any reason rendered inoperative.

As further shown in FIG. 4, the other end of bellows 4 is secured to an axially movable stud 18 instead of housing 6 as in FIGS. 2 and 3. Under conditions of normal operation, the stud 18 is held in the position shown in FIG. 4 by a detent ball 19 forced by compression spring 20 against detent valve seat 21. Detent ball 19 is proportioned to project into a circumferential groove 22 formed in stud 18 thereby preventing its axial movement unless the forces acting on detent ball 19 are overcome.

The override valve 16 comprises a spool valve 23 with cylindrical sections 24, 25, and 26 and intermediate sections of reduced diameter, designated 27 and 28. Cylindrical section 26 is integrally connected to an indicator 29 that projects outside of housing 6. The indicator shows the position of spool valve 23 under all conditions of operation. A compression spring 30, trapped between cylindrical section 26 of spool valve 23 and the interior of housing 6, tends to force the spool valve to the left as viewed in FIG. 4.

Intermediate section 28 of spool valve 23 is in fluid communication with source 1 via channel 13, mid-section 12 of spool valve 10 and channel 31 formed within housing 6. However, under conditions of normal operation, both at seal level and at high altitude, flow of oil from channel 13 to channel 14 is controlled solely by spool valve 10, as has been explained, and not by spool valve 23 of the override valve 16. Oil dumped to channel 15 flows past intermediate section 28 of spool valve 23 to an exhaust port 15a and thence back to sump 8.

Under normal operating conditions, cylindrical section 24 of spool valve 23 blocks flow of oil to channel 32 and interconnecting channel 33 formed within housing 6 to communicate with channel 14. It should be noted, however, that the pressure of the oil within channel 32 causes oil to leak past section 24 of spool valve 23 into channel 34 communicating with detent valve 17. The oil exerts pressure on detent ball 19 thereby augmenting the force of spring 20. Detent ball 19 is thus held firmly against seat 21 preventing flow of oil to groove 22 and channel 35 which is connected to sump 8. A pin 36, projecting from stud 18, provides means for confirming that the detent valve is operational. By applying force to pin 36, detent ball 19 may be forced off seat 21 thereby establishing that spring 20 is functional and that detent ball 19 is not jammed.

The pressure of the oil surrounding intermediate section 27 of spool valve 23 acts equally on the adjacent faces of cylindrical sections 24 and 25 generating forces that balance each other. Similarly, the pressure of the oil surrounding intermediate section 28 acts equally on the adjacent faces of cylindrical sections 25 and 26 generating forces that balance each other. The only forces tending to move spool valve 23 are caused by the pressure of oil within channel 34, acting on the end of cylindrical section 24, and the force of compression spring 30. To assure such an operating condition, the space surrounding spring 30 is vented at 37 to sump 8. Whether the engine is operating at sea level or altitude, the pressure of the oil in channel 34, acting on the end of cylindrical section 24, is sufficient to compress spring 30 so that the spool valve 23 is positioned as shown in FIG. 4.

Thus, under all normal conditions of operation, the oil flowing from source 1 to gearbox 2 is under the control of spool valve 10 rather than override valve 16, and the position of spool valve 10 is controlled by bellows 4 as has already been explained with reference to FIGS. 2 and 3.

Figure 5:
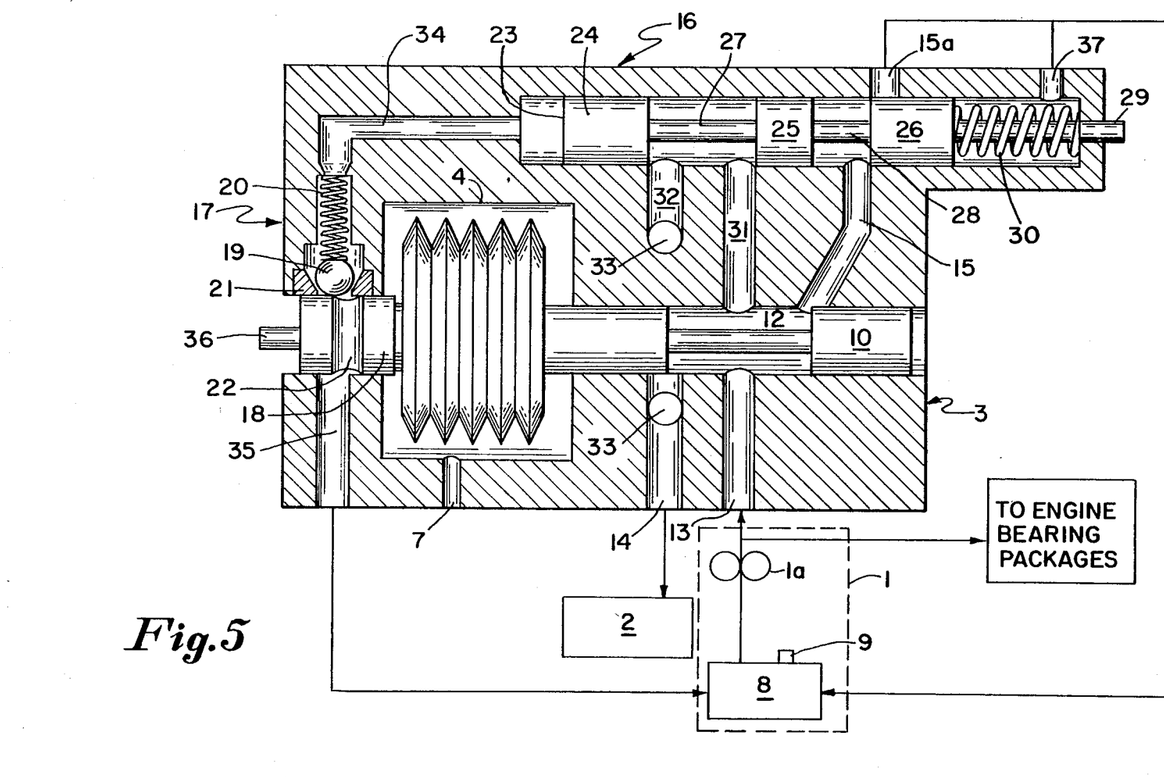
FIG. 5 is a schematic showing the positions of the associated valve elements when the regulating valve is jammed.

FIG. 5 shows a condition of abnormal operation caused by the jamming of spool valve 10 of regulating valve 3. Were that to occur at altitude, spool valve 10 would remain in the position shown in FIG. 5 as the engine descends toward sea level, thereby starving gearbox 2 of required lubrication. However, as will now be described, override valve 16 acts to prevent such an occurrence.

As the pressure of ambient air increases with decreasing altitude, bellows 4 is gradually compressed. Since spool valve 10 is held immobile, stud 18 moves with bellows 4 and overcomes the force of detent valve 19, forcing it off seat 21. That permits the oil in channel 34 to vent to channel 35 via groove 22 of stud 18. Venting the oil drops the pressure of the oil acting on the end of cylindrical section 24 of spool valve 23. That permits spring 30 to force spool valve 23 to the left until it assumes the position shown in FIG. 5. In that position, cylindrical section 26 blocks the flow of oil from channel 15 to exhaust port 15a. Simultaneously, intermediate section 27 is positioned to admit oil from source 1 through channels 13, 31, 32, and 33 to channel 14 and thence to gearbox 2. Since the flow of oil is not impeded, gearbox 2 receives the full flow appropriate for sea level operation regardless of the altitude at which the engine is operating. In this way, safe operation of the gearbox is assured.

It should be noted that the override valve 16 acts automatically to establish safe operating conditions without human intervention. Inspection will, however, reveal system abnormality since both indicator 29 and pin 36 will have shifted position into housing 6.

Figure 6:
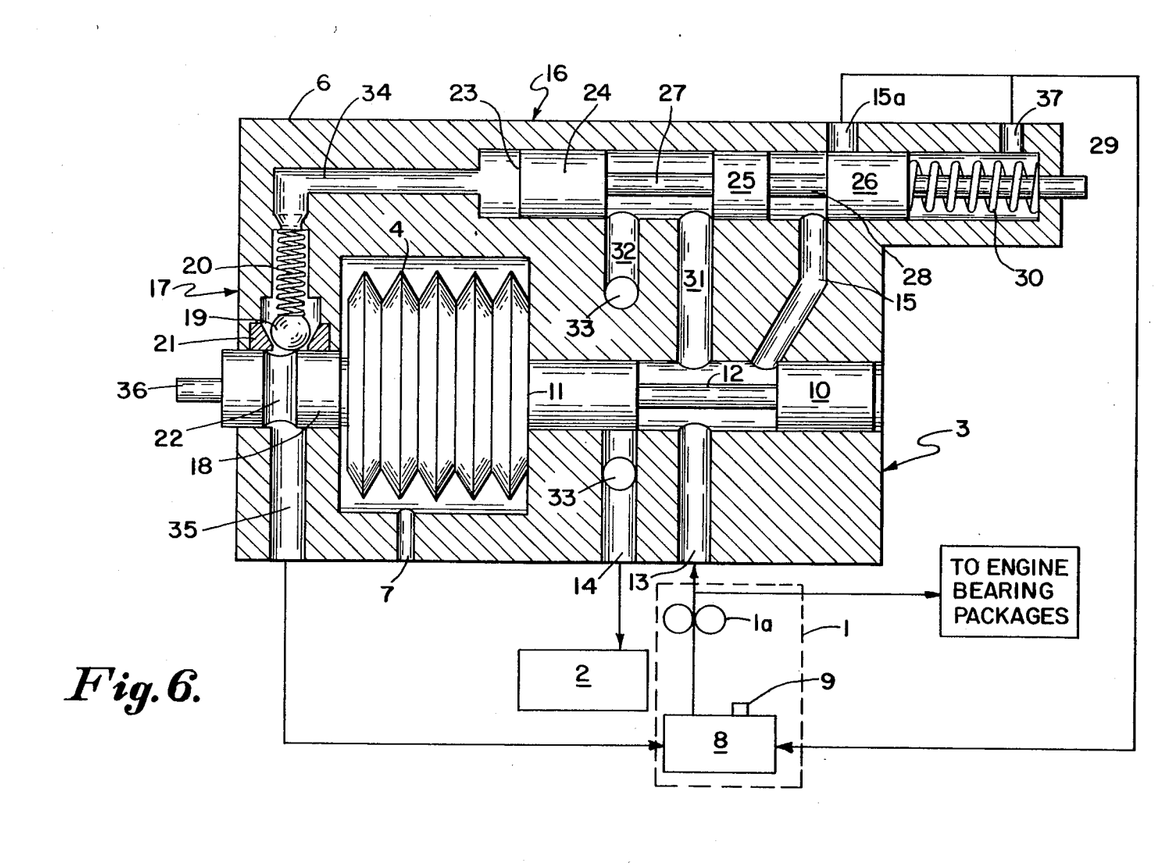
FIG. 6 is a schematic showing the positions of the associated valve elements when the altitude sensor has failed.

FIG. 6 illustrates another abnormal operating condition that would result from failure of bellows 4 to maintain its evacuation. Should that occur, the inherent spring force of bellows 4 would cause it to expand fully until restrained by housing 6. Full expansion of the bellows forces stud 18 to the left as shown in FIG. 6. Once again, detent ball 19 is forced off seat 21 by movement of stud 18, dropping the pressure of the oil in channel 34 and permitting the override valve 16 to assume control of the oil flowing to gearbox 2 in a manner similar to that described with reference to FIG. 5. In this case, however, pin 36 is forced outside of housing 6 thereby indicating that bellows 4, rather than regulating valve 3, has failed.

It will be understood from the foregoing description of normal operation that, when the engine is idle at sea level, bellows 4 is collapsed and channels 13 and 14 are in communication via mid-section 12 of spool valve 10. Further, under such conditions, no pressure is exerted against the end of cylindrical section 24 of spool valve 23 thereby permitting spring 30 to force the spool valve to the left as shown in FIGS. 5 and 6. When the engine is started, oil under pressure becomes available at source 1, and leakage of oil past cylindrical section 24 of spool valve 23 into channel 34 develops force against the end of spool valve 23 moving it to the right into the position shown in FIG. 4.

The novel lubrication system described has a very high degree of reliability which is essential for aircraft operation. In itself, the regulating valve is highly reliable, and the possibility that its spool valve would jam is very remote. Likewise, the possibility that the altitude sensor would fail is equally remote.

According to the above description, the following invention is claimed as novel and is desired to be secured by Letters Patent of the United States.

We claim:

1. A lubrication system for controlling the flow of lubricant as a function of the altitude at which a gas turbine engine is operating comprising:
   a source of lubricant under pressure;
   a unit requiring lubrication;
   a movable valve in fluid communication with said source and with said unit for regulating the flow of lubricant from said source to said unit; and
   an altitude sensor associated with said movable valve for positioning said movable valve to control the flow of lubricant from said source to said unit as a function of the altitude at which the engine is operating.

2. A system for controlling the amount of lubricant supplied to a unit of a gas turbine engine as described in claim 1 further comprising:
   an override valve in fluid communication with said movable valve, said source, and said unit for by-passing said movable valve and admitting lubricant from said source to said unit when said movable valve is inoperative.

3. A lubrication system for controlling the flow of lubricant in a gas turbine engine as a function of the altitude at which the engine is operating comprising:
   a source of lubricant under pressure;
   a gearbox driven by the engine;
   a regulating valve including a movable spool valve and channels in fluid communications with said source and said gearbox; and
   an evacuated bellows subjected to ambient pressure at the altitude at which the engine is operating, said bellows expanding in response to increases in altitude and positioning said movable spool valve to reduce the amount of lubricant flowing through the channels from said source to said gearbox.

4. A system for controlling the amount of lubricant flowing to the gearbox of a gas turbine engine as described in claim 3 further comprising:
   an override valve in fluid communication with said regulating valve, said source, and said gearbox for by-passing said regulating valve and assuming control of lubricant flowing from said source to said gearbox when said spool valve of said regulating valve is inoperative.

5. A lubrication system for an aircraft gas turbine engine comprising:
   a sump holding a supply of lubricant;
   a gear pump driven by the engine for pumping lubricant from said sump to create a source of lubricant under pressure;
   a housing including a first channel in fluid communication with said source, a second channel in fluid communication with said gearbox, and a third channel in fluid communication with said sump;
   a first spool valve movable within said housing, said spool valve having a mid-section of reduced diameter proportioned to interconnect the first and second channels and to dump lubricant to the third channel as a function of the position of said first spool valve; and
   an evacuated bellows fixed at one end and connected at its other end to said first spool valve, the exterior of said bellows being subjected to ambient pressure and expanding as the altitude at which the engine is operating increases, such expansion positioning said first spool valve to reduce flow of lubricant from the first channel to the second channel and to dump lubricant to the third channel.

6. A lubrication system as described in claim 5 further comprising:
   an override valve within said housing including a second movable spool valve communicating with the first, second and third channels to permit dumping of lubricant to said sump under conditions of normal operation and to block the dumping of oil and to interconnect the first and second channels when said first spool valve is inoperative.

7. A lubrication system for an aircraft gas turbine engine comprising:
   a sump holding a supply of lubricant;
   a gear pump driven by the engine for pumping lubricant from said sump to create a source of lubricant under pressure;
   a housing including a first channel in fluid communication with said source, a second channel in fluid communication with said gearbox, and a third channel in fluid communication with said sump;
   a first spool valve movable within said housing, said spool valve having a mid-section of reduced diameter proportioned to interconnect the first and second channels and to dump lubricant to the third channel as a function of the position of said first spool valve;
   an evacuated bellows secured at one end to said first spool valve;
   a stud movably supported by said housing, said stud being secured to the other end of said bellows;
   a detent valve controlled by the position of said stud; and
   an override valve within said housing including a second movable spool valve communicating with the first, second, and third channels to permit dumping of lubricant to said sump under conditions of normal operation, said housing defining a fourth channel interconnecting the end of said second spool valve with said detent valve to convey lubricant leaking past said second spool valve to said detent valve, pressure of lubricant in the fourth channel holding said second spool valve immobile, said detent valve being forced open by movement of said stud when either said bellows or said first spool valve becomes inoperative thereby releasing lubricant from the fourth channel and permitting said second spool valve to shift position, said second spool valve in its shifted position by-passing said first spool valve and controlling flow of lubricant from said source to said gearbox while simultaneously cutting off the dumping of lubricant to said sump.

8. A lubrication system as described in claim 7 and further comprising:
   a compression spring within said housing for shifting the position of said second spool valve when said detent ball is lifted to release lubricant from the fourth channel.

9. A lubrication system as described in claim 8 further comprising:
   a detent ball within said detent valve, a compression spring engaging said ball, and a seat engaged by said ball, said ball being proportioned to project into a circumferential groove formed in said stud, the groove being in fluid communication with said sump, movement of said stud in response to movement of said bellows forcing the groove of said stud into engagement with said detent ball and lifting said detent ball from said seat to release lubricant from the fourth channel past the groove of said stud to said sump.

10. A lubrication system for an aircraft gas turbine engine as described in claim 9 further comprising:
    an indicator associated with said second spool valve to disclose its position under all conditions of operation.

11. A lubrication system for an aircraft gas turbine engine as described in claim 10 further comprising:
    means for moving said stud to establish whether said detent valve is operable.

12. A lubrication system for an aircraft gas turbine engine comprising:
    a source of lubricant under pressure;
    a sump;
    a gearbox requiring lubrication;
    a regulating valve in fluid communication with said source, said gearbox, and said sump for controlling flow of lubricant from said source to said gearbox and for dumping lubricant to said sump when the engine is operating at altitude;
    an override valve in fluid communication with said regulating valve and said sump;
    means for rendering said override valve inoperative when said regulating valve is operative; and
    means associated with said regulating valve and said first named means for forcing said first named means to release said override valve for operation when said regulating valve is inoperative, said override valve thereafter controlling flow of lubricant from said source to said gearbox and blocking flow of lubricant to said sump.

13. A lubrication system for a gas turbine engine as described in claim 12 further comprising:
    an altitude sensor for controlling said regulating valve as a function of the altitude at which the engine is operating.

* * * * *